(12) United States Patent
Aman et al.

(10) Patent No.: US 8,192,851 B2
(45) Date of Patent: Jun. 5, 2012

(54) DIELECTRIC CERAMIC COMPOSITION AND ELECTRONIC DEVICE

(75) Inventors: Sanshiro Aman, Narita (JP); Takashi Kojima, Narita (JP); Mari Miyauchi, Narita (JP); Masakazu Hosono, Narita (JP); Dan Sakurai, Yurihonjo (JP); Kosuke Takano, Narita (JP); Nobuto Morigasaki, Narita (JP)

(73) Assignee: TDK Corporation, Tokyo (JP)

( * ) Notice: Subject to any disclaimer, the term of this patent is extended or adjusted under 35 U.S.C. 154(b) by 959 days.

(21) Appl. No.: 12/071,465

(22) Filed: Feb. 21, 2008

(65) Prior Publication Data

US 2008/0226944 A1     Sep. 18, 2008

(30) Foreign Application Priority Data

Mar. 14, 2007 (JP) .................. 2007-065853
Mar. 14, 2007 (JP) .................. 2007-065854

(51) Int. Cl.
*B32B 9/00* (2006.01)
*C04B 35/01* (2006.01)
*C04B 35/04* (2006.01)

(52) U.S. Cl. ........ 428/701; 428/702; 501/137; 501/138; 501/139

(58) Field of Classification Search .................. None
See application file for complete search history.

(56) References Cited

U.S. PATENT DOCUMENTS

| | | | |
|---|---|---|---|
| 6,087,287 A * | 7/2000 | Iguchi et al. | 501/137 |
| 6,437,969 B2 * | 8/2002 | Mizuno et al. | 361/311 |
| 2007/0155613 A1 * | 7/2007 | Ito et al. | 501/137 |

FOREIGN PATENT DOCUMENTS

| | | |
|---|---|---|
| EP | 0 877 399 A2 | 11/1998 |
| EP | 1 612 817 A2 | 1/2006 |
| EP | 1 786 005 A1 | 5/2007 |
| EP | 1 792 880 A1 | 6/2007 |
| JP | A-2001-230148 | 8/2001 |

(Continued)

OTHER PUBLICATIONS

F. Moura et al., "Dielectric and ferroelectric characteristics of barium zirconate titanate ceramics prepared from mixed oxide method", Jul. 26, 2007, Journal of Alloys and Compound, 462 (2008) pp. 129-134.*

(Continued)

*Primary Examiner* — Timothy Speer
(74) *Attorney, Agent, or Firm* — Oliff & Berridge, PLC

(57) ABSTRACT

A dielectric ceramic composition comprises a main component including $BaTiO_3$, a first subcomponent including $BaZrO_3$, a second subcomponent including an oxide of Mg, a third subcomponent including an oxide of rare earth, a fourth subcomponent including an oxide of at least one element selected from Mn, Cr, Co and Fe, and a fifth subcomponent including an oxide of at least one element selected from Si, Al, Ge, B and Li. At least a part of dielectric particles constituting the dielectric ceramic composition comprises a surface diffusion structure comprised of a central layer and a diffusion layer therearound. CR and CRmax, respectively defined as a concentration of said "R" in a proximity point to a boundary face of the dielectric particle and a maximum concentration of the "R" in the diffusion layer, satisfy a relation of CRmax/CR>1. Also, CM and CMmax, respectively defined as a concentration of said Mg in a proximity point to a boundary face of the dielectric particle and a maximum concentration of Mg in the diffusion layer, satisfy a relation of CMmax/CM>1.

17 Claims, 6 Drawing Sheets

FOREIGN PATENT DOCUMENTS

| | | |
|---|---|---|
| JP | A-2001-230149 | 8/2001 |
| JP | A-2004-345927 | 12/2004 |
| JP | A-2005-217000 | 8/2005 |
| JP | A-2006-199563 | 8/2006 |

OTHER PUBLICATIONS

XP-002488285; Tomoyuki et al; BaTiO3-based non-reducible low-loss dielectric ceramics; Japanese Journal of Applied Physics, Part 1 Regular Papers and Short Notes and Review Papers (1999).

* cited by examiner

DIELECTRIC CERAMIC COMPOSITION AND ELECTRONIC DEVICE

BACKGROUND OF THE INVENTION

1. Field of the Invention

The present invention relates to a dielectric ceramic composition, and an electronic device comprising a dielectric layer comprised of the dielectric ceramic composition, and further specifically, relates to a dielectric ceramic composition preferable to be used in mid-high voltage applications with high rated voltage (e.g. 100V or more), and electronic device.

2. Description of the Related Art

Recently, it is highly demanded to downsize an electronic device along with densification of electronic circuit. With a rapid progress in downsizing and increasing capacitance of a multilayer ceramic capacitor, applications are expanding, and the required properties are varied.

For example, a mid-high voltage capacitor used at high rated voltage (e.g. 100V or more) can be preferably used in a device such as ECM (engine electric computer module), fuel injector, computerized throttle, inverter, converter, HID headlamp unit, battery control unit of hybrid engine, and digital still camera.

Therefore, when using a mid-high voltage capacitor in the above devices, heat generation due to densified mounting of an electronic device and hard use environment as typified by those of an electronic device for automobile cause problems, so that it is expected to provide a capacitor, usable under high voltage, having small temperature change rate of capacitance, especially at a high temperature of 100° C. or more, and highly reliable.

To address such demands, for example, the Japanese Unexamined Patent Publication 2005-217000 proposes a multilayer ceramic capacitor having a dielectric layer with a constitution that concentrations of Mg, Mn and rare earth element in crystal grain are gradually increased from a core of the crystal grain to crystal grain boundary.

Also, the Japanese Unexamined Patent Publication 2001-230149 proposes a multilayer ceramic capacitor having a dielectric layer comprised of dielectric particle with core-shell structure, wherein a shell portion includes an acceptor type element (such as Mn), Mg and rare earth element, and concentrations of the acceptor type element and rare earth element included in the shell portion are gradually increased from a boundary between the core portion and the shell portion to crystal grain boundary.

Further, in the Japanese Unexamined Patent Publication 2001-230148, there is proposed a multilayer ceramic capacitor having a dielectric layer comprised of dielectric particle which is solid solution, wherein concentrations of an acceptor type element such as Mn, and rare earth element such as Ho, included in the dielectric particle, are gradually increased from a core of the particle to crystal grain boundary.

However, in the multilayer ceramic capacitor disclosed in the Japanese Unexamined Patent Publication 2005-217000, test voltage of IR (insulation resistance) lifetime is as low as 4.75V/μm, indicating this is not for use under high voltage. On the other hand, the Japanese Unexamined Patent Publication 2001-230149 only describes that the disclosed multilayer ceramic capacitor is preferred to have capacitance-temperature characteristic satisfying B characteristic, indicating this is not for use at high temperature. Also, the multilayer ceramic capacitor disclosed in the Japanese Unexamined Patent Publication 2001-230148 only satisfies F characteristic for capacitance-temperature characteristic, indicating this is not for use at high temperature as with the Japanese Unexamined Patent Publication 2001-230149.

Also, in a multilayer ceramic capacitor using a dielectric ceramic composition having barium titanate showing ferroelectricity as a main component, when applying electric field, electrostrictive phenomenon, i.e. generation of mechanical distortion, occurs. Vibration noise caused by vibration due to the electrostrictive phenomenon may be in the noise level uncomfortable for men, so that countermeasures are required.

SUMMARY OF THE INVENTION

A purpose of the present invention, reflecting this situation, is to provide a dielectric ceramic composition, low in electrostrictive amount when applying voltage and able to improve temperature change rate of capacitance at high temperature and/or IR (insulation resistance) lifetime, and an electronic device comprising the dielectric ceramic composition as a dielectric layer.

As a result of keen examinations to attain the above purpose, the present inventors found that a dielectric ceramic composition comprising a main component including barium titanate and specific subcomponent can reduce an electrostrictive amount when applying voltage. Further, the present inventors found that in a dielectric particle constituting the dielectric ceramic composition, it can improve temperature change rate of capacitance at high temperature and/or IR lifetime by making a concentration of a specific subcomponent element in a region, wherein subcomponent elements are diffused in a main component element, higher than that of the subcomponent element near a boundary face of a crystal grain boundary, and came to complete the present invention based on the findings.

Namely, a dielectric ceramic composition according to a first aspect of the present invention comprises a main component including barium titanate, a first subcomponent including $BaZrO_3$, a second subcomponent including an oxide of Mg, a third subcomponent including an oxide of "R", wherein "R" is at least one selected from Sc, Y, La, Ce, Pr, Nd, Pm, Sm, Eu, Gd, Tb, Dy, Ho, Er, Tm, Yb and Lu, a fourth subcomponent including an oxide of at least one element selected from Mn, Cr, Co and Fe, and a fifth subcomponent including an oxide of at least one element selected from Si, Al, Ge, B and Li, wherein said dielectric ceramic composition comprises a plurality of dielectric particles, and crystal grain boundaries between adjacent dielectric particles;

at least a part of said plurality of dielectric particles comprises a surface diffusion structure comprised of a central layer, and a diffusion layer around said central layer in which said subcomponents are diffused; and in the dielectric particle having said surface diffusion structure, in a direction starting from said crystal grain boundary to an approximate center of said dielectric particle, when a concentration of said "R" in a proximity point to a boundary face positioned at a distance of 5% of particle size of the dielectric particle from the boundary face of said crystal grain boundary is defined as CR, and a maximum concentration of said "R" in said diffusion layer is defined as CRmax, CR and CRmax satisfy a relation of CRmax/CR>1.

A dielectric ceramic composition according to a second aspect of the present invention comprises a main component including barium titanate, a first subcomponent including $BaZrO_3$, a second subcomponent including an oxide of Mg, a third subcomponent including an oxide of "R" (note that "R" is at least one selected from Sc, Y, La, Ce, Pr, Nd, Pm, Sm, Eu, Gd, Tb, Dy, Ho, Er, Tm, Yb and Lu), a fourth subcomponent including an oxide of at least one element selected from Mn, Cr, Co and Fe, and a fifth subcomponent including an oxide of at least one element selected from Si, Al, Ge, B and Li, wherein said dielectric ceramic composition comprises a plurality of dielectric particles, and crystal grain boundaries between adjacent dielectric particles;

at least a part of said plurality of dielectric particles comprises a surface diffusion structure comprised of a central layer, and a diffusion layer around said central layer in which said subcomponents are diffused; and in the dielectric particle having said surface diffusion structure, in a direction starting from said crystal grain boundary to an approximate center of said dielectric particle, when a concentration of said Mg in a proximity point to a boundary face positioned at a distance of 5% of particle size of the dielectric particle from the boundary face of said crystal grain boundary is defined as CM, and a maximum concentration of said Mg in said diffusion layer is defined as CMmax, CM and CMmax satisfy a relation of CMmax/CM>1.

Each dielectric ceramic composition according to the first and second aspects of the present invention can be reduced in electrostrictive amount when applying voltage by inclusion of the main component including barium titanate and the above specific subcomponent. Also, at least a part of a plurality of the dielectric particles constituting the dielectric ceramic composition of the present invention has a surface diffusion structure. The surface diffusion structure means a structure comprised of a central layer substantially consisting of main component, and a diffusion layer around the central layer wherein the subcomponents are diffused in the main component.

In the first aspect of the present invention, "R" element is present in the diffusion layer. In addition, concentration of "R" in the diffusion layer has a distribution that the maximum concentration (CRmax) of the "R" in any point in the diffusion layer is larger than that (CR) of "R" in a proximity point to the boundary face of the dielectric particle. Namely, the diffusion layer has a concentration distribution satisfying CRmax/CR>1. It results in improving capacitance-temperature characteristic.

In the second aspect of the present invention, Mg element is present in the diffusion layer. In addition, concentration of Mg in the diffusion layer has a distribution that the maximum concentration (CMmax) of the Mg in any point in the diffusion layer is larger than that (CM) of Mg in a proximity point to the boundary face of the dielectric particle. Namely, the diffusion layer has a concentration distribution satisfying CMmax/CM>1. It results in improving IR lifetime while maintaining specific permittivity and electrostrictive amount well.

Preferably, in the first aspect, an abundance ratio of the dielectric particle satisfying a relation of CRmax/CR>1 is 70% or more, more preferably 90% or more, with respect to all dielectric particles having said surface diffusion structure. Also, in the second aspect, an abundance ratio of the dielectric particle satisfying a relation of CMmax/CM>1 is 70% or more, more preferably 90% or more, with respect to all dielectric particles having said surface diffusion structure.

By making the abundance ratio of dielectric particles satisfying a relation of CRmax/CR>1 or CMmax/CM>1 within the above range, the above-mentioned effects are further increased.

Preferably, in the first and second aspects of the present invention, a ratio of each subcomponent, calculated as a conversion of an oxide or a composite oxide, with respect to 100 moles of said main component is the first subcomponent: 9 to 13 moles, the second subcomponent: 2.7 to 5.7 moles, the third subcomponent: 4.5 to 5.5 moles, fourth subcomponent: 0.5 to 1.5 moles, and fifth subcomponent: 3.0 to 3.9 moles. By making an amount of each subcomponent within the above range, especially, temperature change rate of capacitance can be further improved.

Also, according to the present invention, there is provided an electronic device comprising a dielectric layer and an internal electrode layer, wherein said dielectric layer is comprised of any dielectric ceramic composition as mentioned above.

An electronic device according to the present invention is not particularly limited, and there may be mentioned a multilayer ceramic capacitor, piezo element, chip inductor, chip varistor, chip thermistor, chip resistor and other surface mount chip-type electronic devices (SMD).

BRIEF DESCRIPTION OF THE DRAWINGS

Hereinafter, the present invention will be described based on embodiments shown in drawings.

DESCRIPTION OF THE PREFERRED EMBODIMENTS

Multilayer Ceramic Capacitor 1

Figure 1:
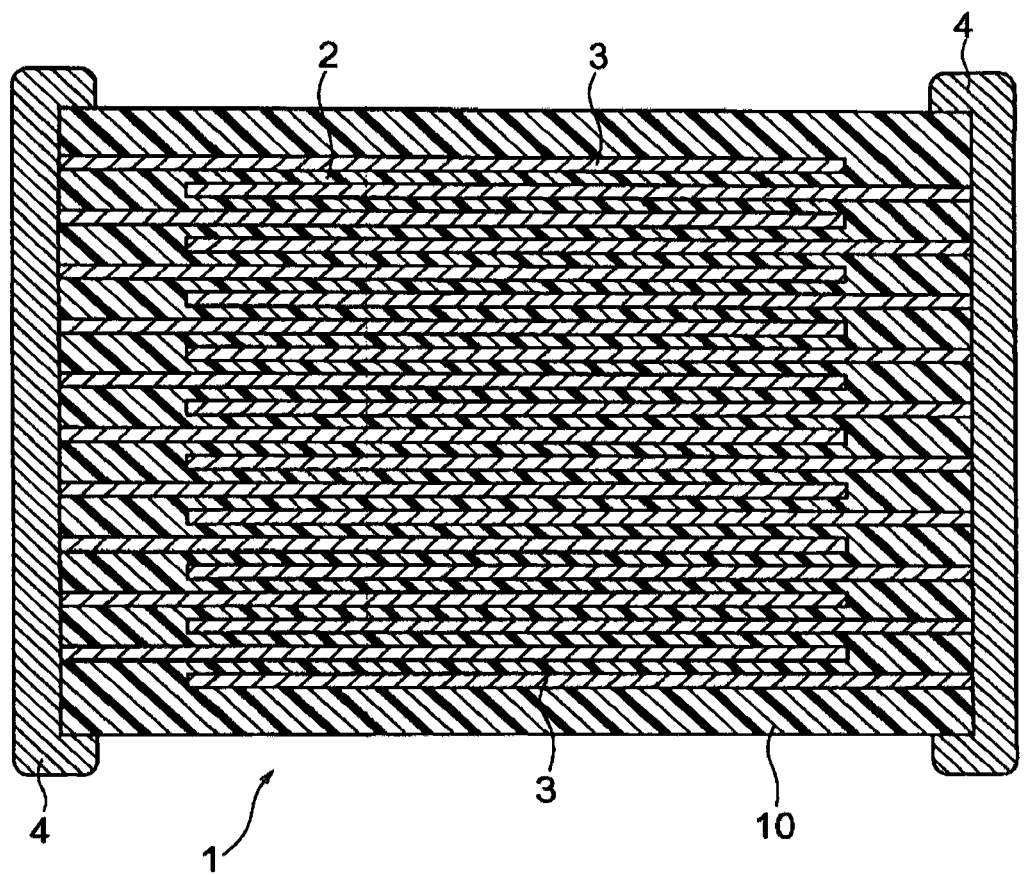
FIG. 1 is a cross-sectional view of a multilayer ceramic capacitor according to an embodiment of the present invention.

As shown in FIG. 1, a multilayer ceramic capacitor 1 according to an embodiment of the present invention comprises a capacitor device body 10 wherein a dielectric layer 2 and an internal electrode layer 3 are alternately stacked. At the both end portions of the capacitor device body 10, a pair of external electrodes 4, connected with internal electrode layers 3 alternately stacked inside the device body 10, is formed. The shape of the capacitor device body 10 is not particularly limited, and is normally rectangular parallelepiped. Also, its dimension is not particularly limited, and may be properly changed as usage.

The internal electrode layers 3 are stacked so that each end face is alternately exposed to surfaces of the two opposed end portions of the capacitor device body 10. Also, the pair of external electrodes 4 is formed at both end portions of the capacitor device body 10, and connected with the exposed end faces of the alternately-stacked internal electrode layers 3 to form a capacitor circuit.

Dielectric Layer 2

The dielectric layer 2 includes the dielectric ceramic composition of the present invention.

The dielectric ceramic composition of the present invention comprises:

a main component including barium titanate, a first subcomponent including $BaZrO_3$, a second subcomponent including an oxide of Mg, a third subcomponent including an oxide of "R" (note that "R" is at least one selected from Sc, Y, La, Ce, Pr, Nd, Pm, Sm, Eu, Gd, Tb, Dy, Ho, Er, Tm, Yb and Lu), a fourth subcomponent including an oxide of at least one element selected from Mn, Cr, Co and Fe, and a fifth subcomponent including an oxide of at least one element selected from Si, Al, Ge, B and Li.

For barium titanate included as the main component, for example, those expressed as composition formula of $Ba_m TiO_{2+m}$, wherein "m" in said composition formula satisfies $0.990 < m < 1.010$ and a ratio of Ba and Ti satisfies $0.990 < Ba/Ti < 1.010$, can be used.

A content of the first subcomponent ($BaZrO_3$) calculated as a conversion of $BaZrO_3$ is preferably 9 to 13 moles, more preferably 10 to 13 moles, with respect to 100 moles of the main component. The first subcomponent mainly has an effect to control ferroelectricity of barium titanate as the main component. If a content of the first subcomponent is too small, temperature characteristic when applying voltage tends to deteriorate. On the other hand, if too large, specific permittivity tends to be reduced.

A content of the second subcomponent (an oxide of Mg) calculated as a conversion of MgO is preferably 2.7 to 5.7 moles, more preferably 4.0 to 5.7 moles, with respect to 100 moles of the main component. The second subcomponent mainly has an effect to control ferroelectricity of barium titanate as the main component. If a content of the second subcomponent is too small, temperature characteristic when applying voltage tends to deteriorate. On the other hand, if too large, specific permittivity tends to be reduced.

A content of the third subcomponent (an oxide of "R") calculated as a conversion of $R_2O_3$ is preferably 4.5 to 5.5 moles, more preferably 4.7 to 5.5 moles, with respect to 100 moles of the main component. The third subcomponent mainly has an effect to control ferroelectricity of barium titanate as the main component. If a content of the third subcomponent is too small, temperature characteristic when applying voltage tends to deteriorate. On the other hand, if too large, specific permittivity tends to be reduced. Note that "R" element constituting the above oxide of "R" is preferably at least one selected from Gd, Tb, Eu, Y, La and Ce, and particularly preferably Gd.

A content of the fourth subcomponent (an oxide of Mn, Cr, Co and Fe) calculated as a conversion of MnO, $Cr_2O_3$, $Co_3O_4$ or $Fe_2O_3$ is preferably 0.5 to 1.5 moles, more preferably 0.7 to 1.2 moles, with respect to 100 moles of the main component. If a content of the fourth subcomponent is either too small or too large, insulation resistance tends to be reduced. Note that it is preferred to use an oxide of Mn as the fourth subcomponent since this is largest in improvement effects of properties among the above oxides.

A content of the fifth subcomponent (an oxide of Si, Al, Ge, B and Li) calculated as a conversion of $SiO_2$, $Al_2O_3$, $GeO_2$, $B_2O_3$ or $Li_2O$ is preferably 3.0 to 3.9 moles with respect to 100 moles of the main component. If a content of the fifth subcomponent is too small, sinterability tends to deteriorate.

On the other hand, if too large, specific permittivity tends to be reduced. Note that it is preferred to use an oxide of Si as the fifth subcomponent since this is largest in improvement effects of properties among the above oxides.

Structure of Dielectric Particle

Figure 2:
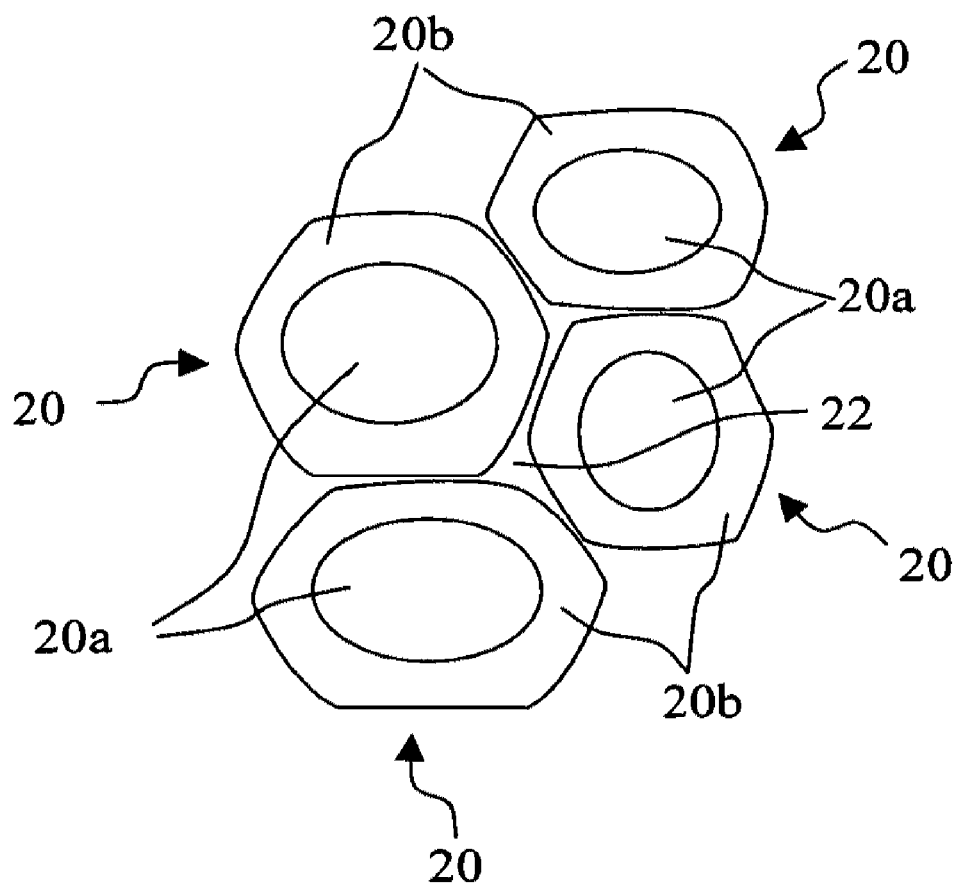
FIG. 2 is a pattern view of surface diffusion particles according to an embodiment of the present invention.

In the present embodiment, at least a part of dielectric particles included in the above dielectric layer 2 is surface diffusion particle 20 having a surface diffusion structure as shown in FIG. 2, and a crystal grain boundary 22 is present between adjacent particles. The surface diffusion particle 20 is composed of a central layer 20a including barium titanate as a main component, and a diffusion layer 20b around the central layer 20a wherein components other than barium titanate are diffused in barium titanate. The central layer 20a shows ferroelectric characteristics since it is substantially comprised of barium titanate. On the other hand, the diffusion layer 20b loses ferroelectric characteristics and shows normal dielectric characteristics since elements added as the above subcomponent are mainly diffused (solid-dispersed) in barium titanate.

In the present embodiment, there is described a case that "R" element is present in the diffusion layer 20b (the first aspect of the present invention), which is same as in a case that Mg element is present in the diffusion layer 20b (the second aspect of the present invention).

It can be examined whether a dielectric particle has the above surface diffusion structure or not, for example, by analyzing the dielectric particle with an energy dispersive X-ray spectrometer of transmission electron microscope (TEM). Specifically, for the dielectric particle, line analysis is first performed on the line passing through an approximate center of the particle to obtain a concentration distribution of each element. Then, on a line turned at 90 degrees, line analysis is repeated for the identical particle. From the obtained concentration distribution, it is examined, for example, whether there is an area wherein a concentration of subcomponent element is significantly declined, namely whether central layer 20a is present or not.

In the dielectric particle having such a structure, the diffusion layer 20b showing normal dielectric characteristics exists around the central layer 20a. Consequently, for example, an applied direct voltage is on the diffusion layer 20b with lower permittivity, so that it is possible to inhibit reduction in insulation resistance. In addition, due to the central layer 20a showing ferroelectricity, it is possible to attain high specific permittivity.

An abundance ratio of surface diffusion particles 20 having the above constitution, calculated as number ratio, is preferably 50 to 100%, more preferably 70 to 100%, when assuming the number of all dielectric particles in the dielectric layer 2 as 100%.

In the dielectric particle having the surface diffusion structure according to the present invention, it is distinguishing that there is present a portion within the diffusion layer 20b showing higher concentration of "R" element ("R" is at least one selected from Sc, Y, La, Ce, Pr, Nd, Pm, Sm, Eu, Gd, Tb, Dy, Ho, Er, Tm, Yb and Lu) than a concentration of in a proximity point to the boundary face of the diffusion layer 20b. Also, few "R" elements, subcomponent elements, are diffused in the central layer 20a, a concentration of "R" element in the central layer 20a is lower than that in the diffusion layer 20b. Therefore, in the present invention, the concentration distribution of "R" element shows a mound-shape from the center of the dielectric particle to the surface.

Due to this distinguishing concentration distribution of "R" element, it is possible to improve temperature change rate of capacitance at a high temperature, e.g. at 125° C. while maintaining specific permittivity and electrostrictive amount well.

In the present embodiment, it is evaluated whether "R" element has a mound-shaped concentration distribution or not in the following way.

Figure 3A:
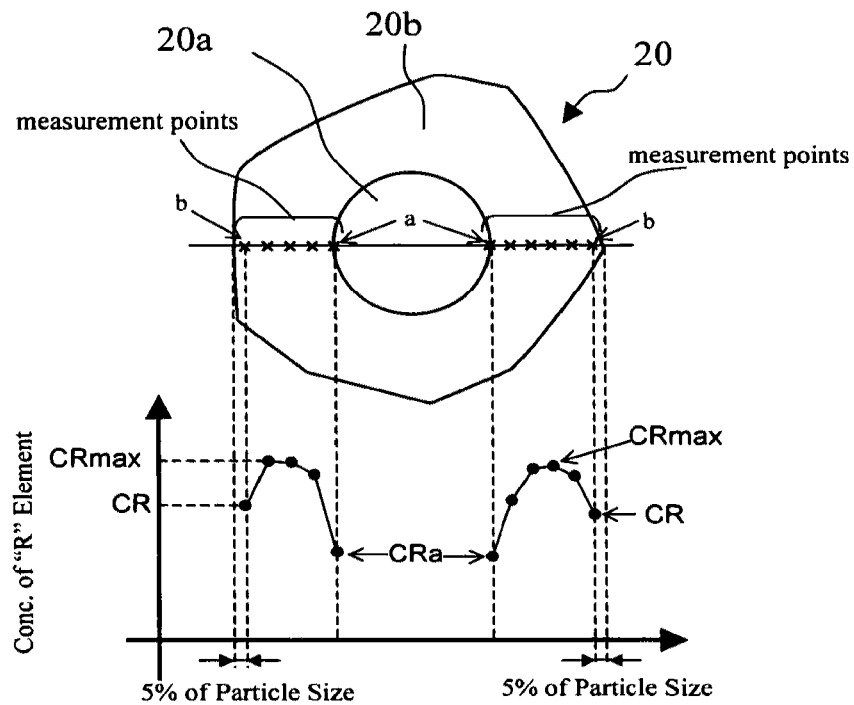
FIG. 3A is a pattern view to explain how to measure CRmax and CR of "R" element in the surface diffusion particle according to an embodiment of the present invention.

As shown in FIG. 3A, for the dielectric particle having the above surface diffusion structure, line analysis is performed on a line from an end to an approximate center of the particle, preferably a line from one end to another of the particle so as to pass through its approximate center, by using an energy dispersive X-ray spectrometer of TEM to measure a concentration of "R" element at each point on the line. The line analysis should be done at a minimum of two points, i.e. a proximity point "B" to the boundary face, and a random point "X" within the diffusion layer other than the point "B".

Note that the point "B" close to boundary face is a point positioned at a distance of 5% of particle size of the dielectric particle from the boundary face of the crystal grain boundary in a direction from the crystal grain boundary to the approximate center of the dielectric particle.

Among concentrations CR1, CR2, ... CRn (n is 1 or more) of "R" element at random points X1, X2, ... Xn (n is 1 or more) within the diffusion layer, a maximum concentration CRmax and a concentration CR of "R" element at the proximity point "B" to boundary face are compared. When CRmax is larger than CR, i.e. CRmax/CR>1, "R" element can be regarded as having a mound-shaped concentration distribution. Even though all CRn except for CRmax are smaller than CR, it is OK as long as CRmax is larger than CR. The random point "X" may be only one within the diffusion layer $20b$, but it is preferred to be 5 or more. Also, it is preferable that a point of the random points "X" is a boundary point "A" between the diffusion layer $20b$ and the central layer $20a$. Further, when a concentration of "R" element at the boundary point "A" is defined as "CRa", CRmax and CRa satisfy preferably CRmax/CRa≧1 and further preferably CRmax/CRa>1.

Preferably, CRmax and CR satisfy $1.1 \leq CRmax/CR \leq 4.8$. When CRmax/CR is too small, capacitance-temperature characteristic tends to deteriorate. When CRmax/CR is too large, capacitance-temperature characteristic also tends to deteriorate.

Note that when the above line analysis is performed on the line from an end of the particle to its approximate center, a concentration distribution of "R" element at one area can be obtained. When the above line analysis is performed on the line from one end to another of the particle so as to pass through its approximate center, concentration distributions of "R" element can be obtained for two facing areas across the central layer of the particle. In the present embodiment, it is preferable to perform the above line analysis on the line from one end to another of the particle so as to pass through the approximate center of the particle, and on a line turned at 90 degrees, to do further line analysis. In this case, concentration distributions of "R" element can be obtained for four areas within the diffusion layer $20b$.

Then, if there is at least one point showing a mound-shaped concentration distribution among the obtained concentration distributions of "R" element, in the particle, "R" element can be regarded as having a mound-shaped concentration distribution. The above line analysis should be done for at least 10 dielectric particles, preferably 20 dielectric particles. It is preferable to simultaneously evaluate whether "R" element has a mound-shaped concentration distribution or not and whether the dielectric particle has a surface diffusion structure or not.

Figure 3B:
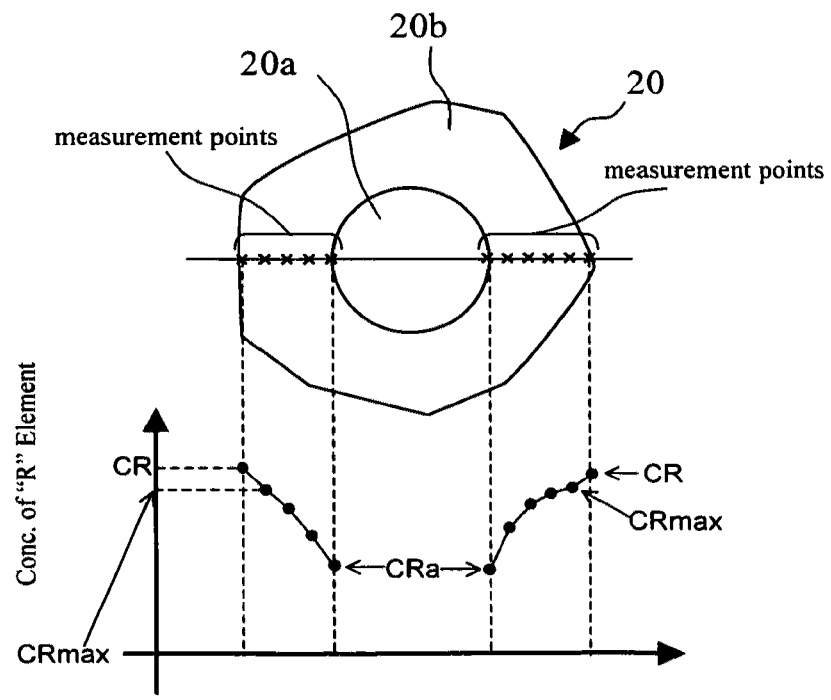
FIG. 3B is a pattern view to explain how to measure CRmax and CR of "R" element in a surface diffusion particle of an example of prior arts.

Note that in a dielectric particle having a surface diffusion structure according to an example of prior arts, as shown in FIG. 3B, normally, from a central portion of the particle or a boundary region between the diffusion layer $20b$ and the central layer $20a$ to a surface of the diffusion layer $20b$, subcomponent elements diffused in the diffusion layer $20b$ are gradually increased in its concentrations.

The above-mentioned mound-shaped concentration distribution of "R" element in diffusion layer $20b$ can be attained, as described later, by calcine/non-calcine of subcomponent materials, control of firing conditions, etc., to control diffusion of "R" elements.

Hereinbefore, a case wherein "R" element is present in the diffusion layer $20b$ is described, and those wherein Mg element is present in the diffusion layer $20b$ can be similarly explained as above.

Namely, among concentrations CM1, CM2, ... CMn (n is 1 or more) of Mg element at random points X1, X2, ... Xn (n is 1 or more) within the diffusion layer, a maximum concentration CMmax and a concentration CM of Mg element at the point "B" close to boundary face are compared. When CMmax is larger than CM, i.e. CMmax/CM>1, IR lifetime can be improved. Note that a measurement of a concentration of Mg element, etc., is same as those of "R" element.

An average particle size of dielectric particles included in the dielectric layer 2 is determined as below. First, the capacitor device body 10 is cut in a stacking direction of the dielectric layer 2 and internal electrode layer 3 to measure an average area of the dielectric particles in section. From the obtained average area, a diameter is calculated assuming the area as a circle. A particle size is a value multiplied the above-obtained diameter by 1.5. It is measured for 200 or more of dielectric particles, and from a cumulative frequency distribution of the obtained particle sizes, a value when the accumulation is 50% is determined as an average particle size (unit of μm).

In the present embodiment, an average particle size can be determined in accordance with the thickness of the dielectric layer 2, etc., and preferably 1.5 μm or smaller.

Internal Electrode Layer 3

As a conducting material included in the internal electrode layer 3, although not particularly limited, relatively inexpensive base metal can be used since constituent materials of the dielectric layer 2 have resistance to reduction. The base metal used as the conducting material is preferably Ni or Ni alloy. As the Ni alloy, it is preferable to use an alloy of Ni with one or more elements selected from Mn, Cr, Co and Al. The content of Ni in the alloy is preferably 95 wt % or more. Note that various trace components such as P may be included approximately in an amount of 0.1 wt % or less in the Ni or Ni alloy. Also, the internal electrode layer 3 may be formed by using commercial electrode paste. The thickness of the internal electrode layer 3 may be properly determined in accordance with application, etc.

External Electrode 4

As a conducting material included in the external electrode 4, although not particularly limited, in the present invention, inexpensive Ni, Cu or their alloys can be used. The thickness of the external electrode 4 may be properly determined in accordance with application, etc.

Production Method of Multilayer Ceramic Capacitor 1

The multilayer ceramic capacitor 1 of the present embodiment is produced, as with conventional multilayer ceramic capacitors, by forming a green chip by a usual printing method or sheet method wherein a paste is used, followed by firing, and printing or transferring an external electrode, followed by firing. Hereinafter, the production method will be specifically described.

First, a dielectric material (dielectric ceramic composition powder) included in a dielectric layer paste is prepared to make a paste, so that the dielectric layer paste is obtained.

The dielectric layer paste may be organic paste obtained by kneading dielectric materials and organic vehicle, or water-based paste.

As the dielectric materials, in addition to the above-mentioned oxides, the mixture thereof, and composite oxides of the main component and subcomponents, it is possible to properly select from various other compounds to become the above-mentioned oxides or composite oxides by firing, for example, carbonate, oxalate, nitrate, hydroxide, organic metallic compounds, etc., to use by mixing. The content of each compound in the dielectric materials may be determined so as to have the above-mentioned compositions of the dielectric ceramic composition after firing. An average particle size of the dielectric materials before forming the paste is usually 0.1 to 1 µm or so.

Barium titanate powder used as the main component material can be produced by various methods such as a variety of liquid phase methods (e.g. oxalate method, hydrothermal synthesis method, alkoxide method, sol-gel method, etc.) as well as so-called solid-phase method. Note that as subcomponent materials, the above materials may be added to the main component material to obtain dielectric materials, but it is preferable to obtain dielectric materials by preliminary calcine of subcomponent materials only, and adding the calcined materials to the main component materials.

The organic vehicle is obtained by dissolving a binder in an organic solvent. The binder used in the organic vehicle is not particularly limited, and may be properly selected from a variety of usual binders such as ethylcellulose and polyvinyl butyral. Also, the organic solvent used is not particularly limited, and may be properly selected from a variety of organic solvents such as terpineol, butyl carbitol, acetone and toluene in accordance with a method used such as a printing method and sheet method.

Also, when using water-based dielectric layer paste, dielectric materials can be kneaded with a water-based vehicle obtained by dissolving an aqueous binder and dispersant, etc., in water. The aqueous binder used for water-based vehicle is not particularly limited, and for example, polyvinyl alcohol, cellulose, aqueous acrylic resin, etc., may be used.

An internal electrode layer paste is obtained by kneading conducting materials consisting of the above mentioned various conducting metals and alloys, or various oxides, organic metallic compound and resinate, etc., which become the above-mentioned conducting materials after firing, with the above-mentioned organic vehicle.

An external electrode paste may be obtained as with the above-mentioned internal electrode layer paste.

The content of organic vehicle in each of the above-mentioned pastes is not particularly limited, and may be usual content, for example, 1 to 5 wt % or so of the binder and 10 to 50 wt % or so of the solvent. Also, in each paste, there may be included additives selected from a variety of dispersants, plasticizer, dielectric, insulators, etc., if needed. The total amounts of these is preferably 10 wt % or less.

When using the printing method, dielectric layer paste and internal electrode layer paste are alternately printed on a substrate such as PET to form layers, and after cutting to a predetermined shape, a green chip is obtained by removing from the substrate.

Also, when using the sheet method, a green sheet is formed by using dielectric layer paste, internal electrode layer paste is printed thereon, and then, these are stacked to form a green chip.

Before firing, the green chip is subject to binder removal treatment. The binder removal conditions include temperature rising rate of preferably 5 to 300° C./hour, holding temperature of preferably 180 to 400° C., and temperature holding time of preferably 0.5 to 24 hours. Also, firing atmosphere is the air or reduced atmosphere.

Firing of the green chip is preferably performed in a reduced atmosphere. As atmosphere gas, for example, a wet mixed gas of $N_2$ and $H_2$ can be used. Other conditions are preferably as below.

First, temperature rising rate is preferably 50 to 500° C./hour, more preferably 200 to 400° C./hour. Also, it is preferable to change the temperature rising rate until a holding temperature at firing. Specifically, for example, the temperature rising rate can be 200° C./hour until 800° C., 300° C./hour from 800° C. to 1000° C., and 400° C./hour from 1000° C. to the holding temperature.

The holding temperature at firing is preferably 1000 to 1400° C., more preferably 1200 to 1350° C. The holding time is preferably 0.5 to 8 hours, more preferably 1 to 3 hours. When the holding temperature is below the above range, densification may be insufficient. When it exceeds the above range, abnormal sintering of the internal electrode layer may cause an electrode breaking, capacitance-temperature characteristics may deteriorate due to dispersion of the materials constituting the internal electrode layer, and the dielectric ceramic composition may be easily reduced.

The oxygen partial pressure at firing may be properly determined in accordance with a type of the conducting material in the internal electrode layer paste. When using base metal including Ni and Ni alloy as the conducting material, oxygen partial pressure in the firing atmosphere is preferably $10^{-14}$ to $10^{-10}$ MPa. When the oxygen partial pressure is below the above range, abnormal sintering may be caused in the conducting material in the internal electrode layer, resulting in an electrode breaking. Also, when the oxygen partial pressure exceeds the above range, the internal electrode layer tends to be oxidized.

Cooling rate is preferably 50 to 500° C./hour, more preferably 200 to 400° C./hour. The cooling rate is, as well as temperature rising rate, preferably changed until room temperature. Specifically, for example, the cooling rate can be 400° C./hour from the holding temperature to 1000° C., 300° C./hour from 1000° C. to 800° C., and 200° C./hour at 800° C. or lower.

In the present embodiment, by combining control in amounts of subcomponent material powders, control in calcine/non-calcine of subcomponent materials, control in the above firing conditions, etc., a diffusive degree of a specific subcomponent in the diffusion layer 20b can be controlled. As a result, for "R" element, it is possible to obtain a distinguishing concentration distribution satisfying CRmax/CR>1.

Note that the same can be applied on Mg element.

After firing in a reducing atmosphere, it is preferable to anneal the capacitor device body. The annealing is a treatment for reoxidizing the dielectric layer and can make IR lifetime significantly longer, so that the reliability is improved.

The oxygen partial pressure in the annealing atmosphere is preferably $10^{-9}$ to $10^{-5}$ MPa. When the oxygen partial pressure is below the above range, it may be difficult to reoxidize the dielectric layer. When it exceeds the above range, the internal electrode layer tends to be further oxidized.

Holding temperature at annealing is preferably 1100° C. or less, particularly preferably 500 to 1100° C. When the holding temperature is below the above range, the dielectric layer may not be sufficiently oxidized, often resulting in lowering IR and shortening IR lifetime. On the other hand, when the holding temperature exceeds the above range, the internal electrode layer is not only oxidized to reduce the capacitance, but also reacts with the dielectric body itself, which may easily cause deteriorated capacitance-temperature characteristics, reduced IR, and reduction in IR lifetime. Note that the annealing may consist of a temperature rising process and temperature falling process. Namely, the temperature holding time may be zero. In this case, the holding temperature is same as the maximum temperature.

Additional annealing conditions include: temperature holding time of preferably 0 to 20 hours, more preferably 2 to 10 hours; and cooling rate of preferably 50 to 500° C./hour, more preferably 100 to 300° C./hour. Also, the atmosphere gas at annealing is preferably a wet $N_2$ gas, for example.

In the above-mentioned binder removal treatment, firing and annealing, a wetter, etc., may be used to wet the $N_2$ gas and mixed gas, for example. In this case, the water temperature is preferably 5 to 75° C. or so.

The binder removal treatment, firing and annealing may be performed continuously or independently.

Thus obtained capacitor device body is then subject to end surface polishing, for example, by barrel-polishing or sand blasting, and the external electrode paste is pasted thereon, followed by firing, so that the external electrode 4 is formed. If needed, a covering layer may be formed on the surface of the external electrode 4 by plating, etc.

Thus produced multilayer ceramic capacitor of the present embodiment is mounted on the printed-circuit board, etc., by soldering, etc., to be used in a variety of electronic devices, etc.

Hereinbefore, an embodiment of the present invention is described, but the present invention is not limited to the above-mentioned embodiments and can be variously modified within the scope of the present invention.

For example, in the above-mentioned embodiment, a multilayer ceramic capacitor is exemplified as an electronic device according to the present invention. However, the electronic device according to the present invention is not limited to the multilayer ceramic capacitor and may be any comprising the dielectric layer having the above composition.

Also, in the above-mentioned embodiment, the case wherein concentration of "R" element satisfies CRmax/CR>1 is described, but it is possible to control the above conditions so as to satisfy both CRmax/CR>1 and CMmax/CM>1. In this way, both temperature change rate of capacitance and IR lifetime can be favorable.

EXAMPLES

Hereinafter, the present invention will be described based on the further detailed examples, but the present invention is not limited to the examples.

Example 1

First, $BaTiO_3$ powder as a main component material, and $BaZrO_3$, $MgCO_3$, $Gd_2O_3$, MnO and $SiO_2$ as subcomponent materials were prepared respectively. Next, only the above-prepared subcomponent materials were calcined at 1000° C. The calcined materials and the main component material were wet pulverized by a ball mill for 15 hours and dried to obtain a dielectric material. Note that an amount of each subcomponent is the amount shown in Table 1, with respect to 100 moles of the main component, $BaTiO_3$.

Note that amounts shown in Table 1 are values calculated as a conversion of composite oxide (first subcomponent) or each oxide (first to fifth subcomponents). Also, the second subcomponent, $MgCO_3$, becomes MgO included in the dielectric ceramic composition after firing.

Next, the obtained dielectric material: 100 parts by weight, polyvinyl butyral resin: 10 parts by weight, dioctyl phthalate (DOP) as a plasticizer: 5 parts by weight, and alcohol as a solvent: 100 parts by weight were mixed by a ball mill to form a paste, so that a dielectric layer paste was obtained.

Also, aside from the above, Ni particles: 44.6 parts by weight, terpineol: 52 parts by weight, ethyl cellulose: 3 parts by weight and benzotriazole: 0.4 parts by weight were kneaded by triple rolls to slurry, so that an internal electrode layer paste was obtained.

Then, by using the above-obtained dielectric layer paste, on a PET film, a green sheet was formed so as to have a thickness after drying of 30 μm. Next, by using the internal electrode layer paste, an electrode layer was printed in a predetermined pattern thereon, followed by removing the sheet from the PET film, so that the green sheet having the electrode layer was obtained. A plurality of green sheets having the electrode layer were stacked and adhered by pressure to obtain a green stacking body. The green stacking body was cut in a predetermined size to obtain a green chip.

Then, the obtained green chip was subject to binder removal treatment, firing and annealing in the following conditions, to obtain a multilayer ceramic fired body.

The binder removal treatment was performed at temperature rising rate: 25° C./hour, holding temperature: 260° C., temperature holding time: 8 hours, and atmosphere: in the air.

The firing was performed at temperature rising rate: 200° C./hour until 800° C., 300° C./hour from 800° C. to 1000° C., and 400° C./hour from 1000° C. to the holding temperature. Also, the holding temperature was 1220 to 1320° C., and cooling rate was changed in the same way as the temperature rising rate. Note that atmosphere gas was wet mixed $N_2+H_2$ gas with oxygen partial pressure of $10^{-12}$ MPa.

The annealing was performed at temperature rising rate: 200° C./hour, holding temperature: 1000° C., temperature holding time: 2 hours, cooling rate: 200° C./hour, and atmosphere gas: wet $N_2$ gas (oxygen partial pressure: $10^{-7}$ MPa).

Note that a wetter was used to wet the atmosphere gas at the firing and annealing.

After polishing end faces of the obtained multilayer ceramic fired body with sandblast, In—Ga was coated as an external electrode to obtain a sample of the multilayer ceramic capacitor shown in FIG. 1. The size of the obtained capacitor sample was 3.2 mm×1.6 mm×0.6 mm, the thickness of the dielectric layer was 20 μm, the thickness of the internal electrode layer was 1.5 μm, and the number of the dielectric layers sandwiched by the internal electrode layers was 10. Note that in the present example, as shown in Table 1, a plurality of capacitor samples, wherein the amount of each subcomponent was varied, were produced.

For each of the obtained capacitor samples, a concentration of Gd element in the diffusion layer was measured by the following method. Then, specific permittivity ($\epsilon$ s), temperature change rate of capacitance and electrostrictive amount due to applying voltage were measured by the methods described below.

Measurement of Concentration of "R" Element in the Diffusion Layer

For each sample, 10 surface diffusion particles were randomly selected. By performing line analysis using an energy dispersive X-ray spectrometer of a transmission electron microscope (TEM), concentration distributions of Gd element in the diffusion layer were measured. First, line analysis was performed on a line from one end to another of the particle so as to pass through an approximate center of the dielectric particle, and another line analysis was done on a line turned at 90 degrees of the identical particle. At this time, 8 areas within the diffusion layer were subject to line analysis, including proximity points to the boundary face and boundary points between the diffusion layer and the central layer.

Namely, a concentration of Gd element at a proximity point to the boundary face was CR, and among 6 points other than the above 2 boundary points, a maximum concentration of Gd element was CRmax.

Electrostrictive Amount Due to Applied Voltage

First, capacitor sample was mounted to a glass epoxy board, on which a predetermined pattern of electrode was printed, by soldering. Next, to the capacitor sample mounted on the board, voltage was applied under conditions of AC at 10 Vrms/μm and frequency at 3 kHz to measure amplitude of vibration of the capacitor sample surface when applying voltage, which was determined as electrostrictive amount. Note that amplitude of vibration of the capacitor sample surface was measured by laser Doppler vibrometer. Also, in the present example, an average of measurements of 10 capacitor samples was determined as electrostrictive amount. The lower electrostrictive amount is more preferable. The results are shown in Table 1.

TABLE 1

| | Subcomponent | | | | | | Characteristics | | |
|---|---|---|---|---|---|---|---|---|---|
| Sample No. | First BaZrO$_3$ [mol] | Second MgO [mol] | Third Gd$_2$O$_3$ [mol] | Fourth MnO [mol] | Fifth SiO$_2$ [mol] | Gd CRmax/CR | Specific Permittivity | Temp Change Rate of Capacitance 125° C.[%] | Electrostrictive Amt [ppm] |
| 1 | 11.1 | 5.2 | 4.9 | 1.1 | 3.1 | 1.5 | 882 | −20 | 30 |
| 2 | 9.9 | 3.7 | 4.8 | 0.8 | 3.2 | 4.2 | 879 | −21 | 31 |
| 3 | 12.5 | 3.1 | 5.3 | 0.7 | 3.1 | 1.1 | 883 | −19 | 28 |
| 4 | 10.5 | 3.7 | 5.1 | 0.8 | 3.6 | 5.5 | 883 | −21 | 29 |
| *5 | 11.6 | 4.5 | 4.2 | 1.2 | 3.6 | 0.9 | 872 | −25 | 31 |
| *6 | 11.6 | 4.3 | 4.6 | 0.8 | 3.1 | 0.4 | 883 | −29 | 20 |
| *7 | 9.9 | 4.2 | 4.7 | 0.7 | 3.7 | 0.7 | 889 | −26 | 31 |
| *8 | 10.3 | 4.7 | 4.5 | 1.4 | 3.6 | 0.5 | 878 | −29 | 32 |

CRmax means a maximum concentration of Gd in the diffusion layer.
CR means a concentration of Gd at a proximity point to a boundary face positioned at a distance of 5% of particle size of the dielectric particle from the crystal grain boundary in a direction from the crystal grain boundary to the approximate center of the dielectric particle.
*means a comparative example of the present invention.

Among the obtained concentration distributions of Gd at 4 areas in the diffusion layer, when at least one point showed a mound-shaped concentration distribution, the particle was regarded as having a mound-shaped concentration distribution of Gd element. The result is shown in Table 1. Note that the "CRmax/CR" value in Table 1 is a maximum value of the "CRmax/CR" values measured at 4 points.

Note that for each capacitor sample, as well as the above measurement, a ratio of dielectric particles having the surface diffusion structure was measured by line analysis using the energy dispersive X-ray spectrometer of the transmission electron microscope (TEM). As a result, for all samples, the ratios were 60% or more.

Specific Permittivity εs

For capacitor samples, by digital LCR meter (4284A by YHP), inputting frequency of 1 kHz and input signal level (measured voltage) of 1 Vrms, capacitance C at 25° C. was measured. Then, specific permittivity εs (no unit) was calculated based on the thickness of the dielectric layer, effective electrode area and the capacitance C obtained by the measurement. In the present example, an average of calculated values on 10 capacitor samples was determined as a specific permittivity. The higher specific permittivity is more preferable. The results are shown in Table 1.

Capacitance-Temperature Characteristic (TC)

For capacitor samples, capacitance at 125° C. was measured to calculate a change rate with respect to the capacitance at a reference temperature (25° C.). The smaller change rate is better, and it is preferably within ±25%. The results are shown in Table 1.

Figure 4:
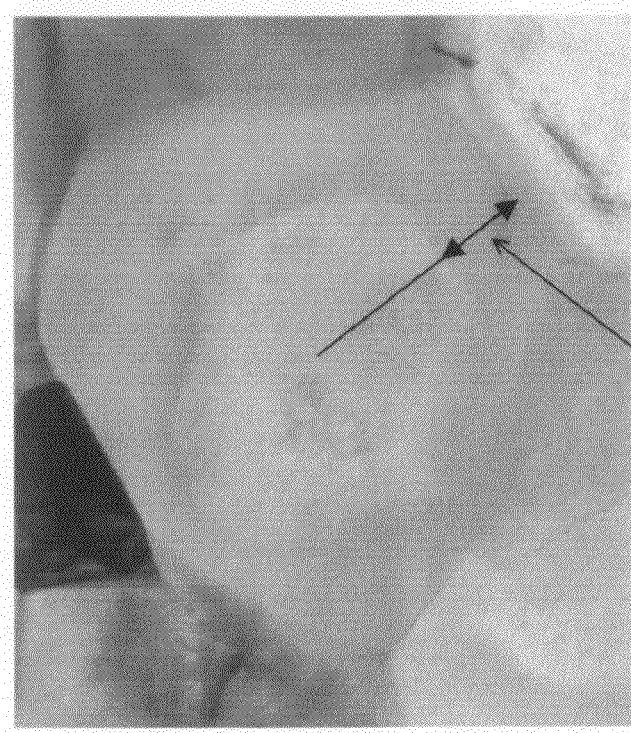
FIG. 4 is a TEM picture of the surface diffusion particle according to an example of the present invention.

Also, FIG. 4 shows a TEM picture of the dielectric particle of Sample No. 1. From the TEM picture, it is confirmed that the dielectric particle has a central layer and a diffusion layer around the central layer. Further, FIG. 5 shows a graph of concentration distributions of Gd elements in the surface diffusion particles according to Sample No. 1, 5 and 6.

From Table 1, samples wherein CRmax/CR of Gd element is larger than 1 (Sample No. 1 to 4) are preferable in specific permittivity and electrostrictive amount, as well as preferable temperature change rate of capacitance at 125° C. On the other hand, it can be confirmed that samples wherein CRmax/CR was smaller than 1 (Sample No. 5 to 8) are inferior in temperature change rate of capacitance at 125° C. Also, from FIG. 5, it can be visually confirmed that Sample No. 1 (Example 1) satisfies a relation of CRmax/CR>1 while Sample No. 5 and 6 (Comparative Example 5 and 6) are out of the range of the present invention. Further, in Sample No. 1, when a concentration of Gd element at boundary point "A" between the central layer and the diffusion layer is defined as "CRa", it can be confirmed to satisfy CRa<CR<CRmax.

Figure 5:
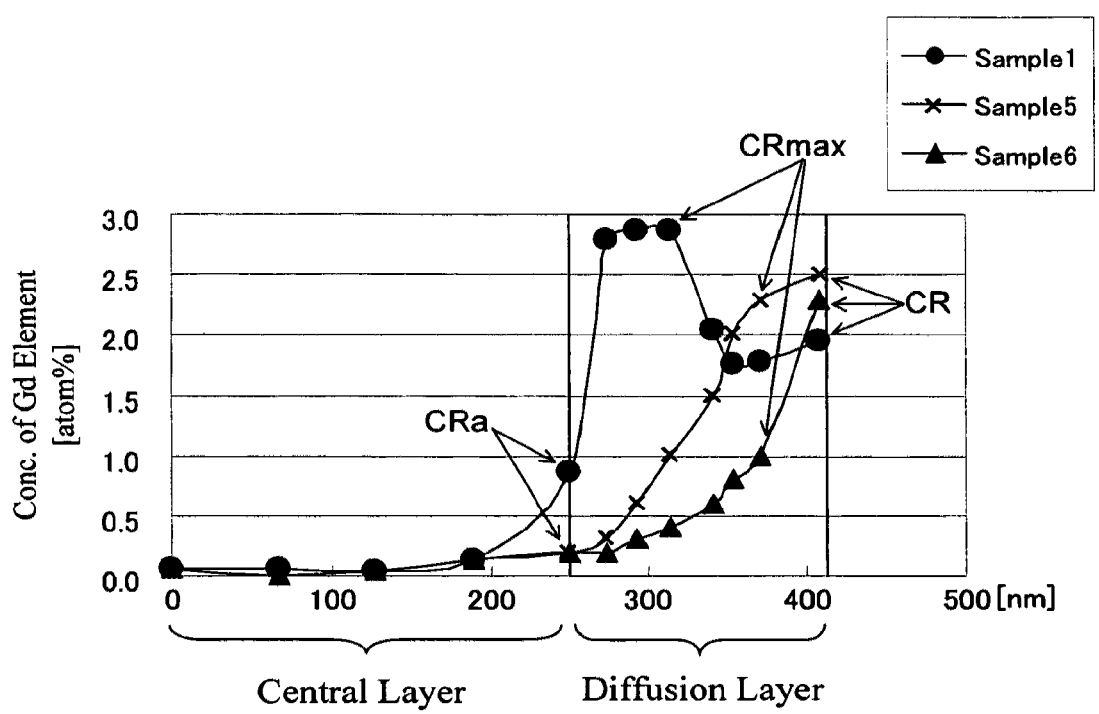
FIG. 5 is a graph showing a concentration distribution of "R" element of the surface diffusion particle according to an example and comparative examples of the present invention.

Note that measurements of concentration distributions for Samples 1, 5 and 6 shown in FIG. 5 were selectively performed on the dielectric particles having same thicknesses of the central layer and diffusion layer.

Example 2

Except for changing an amount of each subcomponent to the amount shown in Table 2, capacitor samples were produced as with Example 1, and same characteristic evaluations were performed as Example 1. The results are shown in Table 2.

TABLE 2

| Sample No. | Subcomponent | | | | | Characteristics | | | |
|---|---|---|---|---|---|---|---|---|---|
| | First BaZrO$_3$ [mol] | Second MgO [mol] | Third Gd$_2$O$_3$ [mol] | Fourth MnO [mol] | Fifth SiO$_2$ [mol] | Gd CRmax/CR | Specific Permittivity | Temp Change Rate of Capacitance 125° C.[%] | Electrostrictive Amt [ppm] |
| **9 | 11.5 | 4.2 | 2.0 | 0.8 | 3.1 | 1.5 | 878 | −23 | 32 |
| 10 | 10.9 | 5.5 | 4.5 | 0.8 | 3.7 | 2.6 | 884 | −17 | 33 |
| 11 | 10.4 | 4.4 | 5.5 | 1.3 | 3.3 | 4.5 | 768 | −16 | 32 |
| **12 | 10.3 | 5.4 | 8.0 | 0.8 | 3.0 | 4.1 | 693 | −18 | 31 |
| **13 | 10.3 | 1.0 | 4.7 | 1.3 | 3.2 | 3.3 | 897 | −21 | 34 |
| 14 | 12.7 | 2.7 | 5.2 | 1.1 | 3.5 | 4.6 | 883 | −16 | 31 |
| 15 | 12.0 | 5.7 | 4.9 | 0.8 | 3.8 | 3.7 | 759 | −18 | 32 |
| **16 | 12.5 | 9.0 | 5.0 | 0.9 | 3.5 | 3.6 | 734 | −24 | 33 |
| **17 | 10.1 | 4.6 | 5.3 | 0.1 | 3.1 | 3.6 | 890 | −20 | 32 |
| 18 | 9.2 | 5.1 | 4.7 | 0.5 | 3.6 | 3.9 | 881 | −18 | 35 |
| 19 | 10.5 | 5.0 | 4.9 | 1.5 | 3.1 | 3.2 | 834 | −16 | 33 |
| **20 | 11.5 | 4.6 | 5.3 | 2.0 | 3.8 | 4.5 | 784 | −22 | 30 |
| **21 | 6.0 | 4.3 | 4.7 | 1.2 | 3.7 | 3.5 | 903 | −23 | 35 |
| 22 | 9.0 | 4.4 | 5.3 | 0.8 | 3.0 | 4.7 | 895 | −17 | 34 |
| 23 | 13.0 | 3.7 | 5.1 | 0.9 | 3.1 | 4.3 | 854 | −16 | 35 |
| **24 | 16.0 | 4.7 | 5.0 | 1.0 | 3.5 | 2.8 | 815 | −21 | 29 |
| **25 | 12.8 | 5.4 | 5.3 | 1.1 | 1.0 | 3.2 | 847 | −19 | 30 |
| 26 | 11.4 | 3.7 | 4.8 | 1.2 | 3.0 | 4.5 | 884 | −18 | 31 |
| 27 | 11.3 | 4.4 | 4.7 | 0.9 | 3.9 | 3.7 | 908 | −17 | 36 |
| **28 | 11.9 | 4.5 | 4.9 | 1.0 | 5.0 | 3.4 | 968 | −22 | 37 |

CRmax means a maximum concentration of Gd in the diffusion layer.
CR means a concentration of Gd at a proximity point to a boundary face positioned at a distance of 5% of particle size of the dielectric particle from the crystal grain boundary in a direction from the crystal grain boundary to the approximate center of the dielectric particle.
**means a sample out of the preferable range of the present invention.

Table 2 shows that when changing an amount of each subcomponent, the amount of each subcomponent within the preferable range of the present invention results in further preferable temperature change rate of capacitance at 125° C. while maintaining specific permittivity and electrostrictive amount well. In contrast, it can be confirmed that samples having an amount of each subcomponent out of the range of the present invention tend to be a little inferior in temperature change rate of capacitance.

Example 3

Except for using "R" element shown in Table 3 instead of Gd as the third subcomponent and changing an amount of each subcomponent to the amount shown in Table 3, capacitor samples were produced as with Example 1, and same characteristic evaluations were performed as Example 1. The results are shown in Table 3.

From Table 3, when changing "R" element of the third subcomponent, by making CRmax/CR larger than 1, it can be confirmed that the similar characteristics are shown as in the case of Gd.

Example 4

Except for changing an amount of each subcomponent to the amount shown in Table 4 and concentration of Mg element, as with Example 1, capacitor samples were produced, and characteristic evaluations were performed on specific permittivity, electrostrictive amount and IR lifetime. The results are shown in Table 4. Note that concentration of Mg element in the diffusion layer was measured in the same way used for "R" element of Example 1, and IR lifetime was evaluated as below.

TABLE 3

| Sample No. | Subcomponent | | | | | | | Characteristics | | |
|---|---|---|---|---|---|---|---|---|---|---|
| | First BaZrO$_3$ [mol] | Second MgO [mol] | Third R$_2$O$_3$ | | Fourth MnO [mol] | Fifth SiO$_2$ [mol] | R CRmax/CR | Specific Permittivity | Temp Change Rate of Capacitance 125° C.[%] | Electrostrictive Amt [ppm] |
| | | | R | Amount [mol] | | | | | | |
| 29 | 10.3 | 3.4 | Tb | 5.3 | 1.1 | 3.3 | 3.4 | 885 | −21 | 32 |
| 30 | 9.6 | 4.7 | Eu | 4.7 | 0.8 | 3.7 | 4.7 | 881 | −21 | 32 |
| 31 | 11.6 | 3.5 | Y | 5.2 | 0.9 | 3.4 | 3.6 | 876 | −20 | 36 |
| 32 | 11.9 | 3.3 | La | 5.3 | 1.1 | 3.1 | 3.5 | 874 | −22 | 35 |
| 33 | 12.5 | 3.7 | Ce | 5.2 | 1.2 | 3.0 | 3.6 | 889 | −21 | 34 |

CRmax means a maximum concentration of R in the diffusion layer.
CR means a concentration of R element at a proximity point to a boundary face positioned at a distance of 5% of particle size of the dielectric particle from the crystal grain boundary in a direction from the crystal grain boundary to the approximate center of the dielectric particle.

IR Lifetime

For capacitor samples, at 200° C., while applying direct voltage under electric field of 40 V/μm, lifetime was measured to evaluate IR lifetime. In the present example, lifetime was defined as a time from starting applying voltage to dropping insulation resistance by 1 digit. Also, the evaluation of IR lifetime was performed on 10 capacitor samples. As a criterion for evaluation, IR lifetime of 20 hours or longer was determined to be good. The results are shown in Table 4.

Sample No. 55 and 56 (Comparative Examples) are out of the range of the present invention. Further, in Sample No. 51, when a concentration of Mg element at a boundary point "A" between the central layer and the diffusion layer is determined as "CMa", it can be confirmed to satisfy CMa<CM<CMmax.

Figure 6:
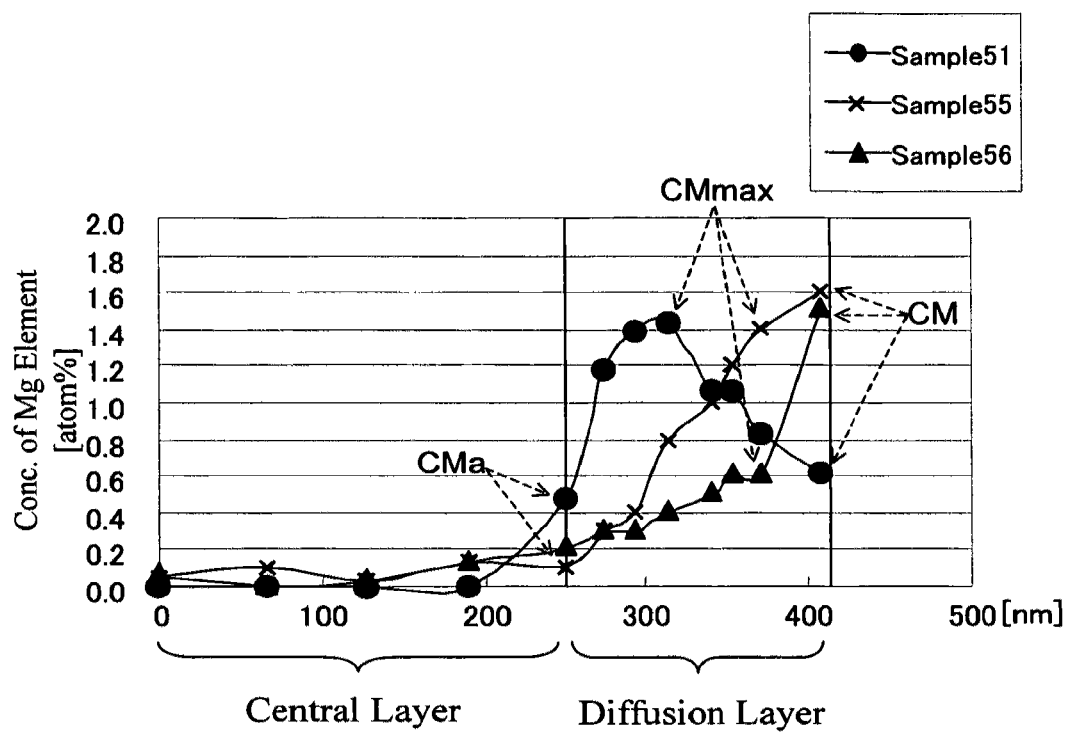
FIG. 6 is a graph showing a concentration distribution of Mg element of the surface diffusion particle according to an example and comparative examples of the present invention.

Note that measurements of concentration distributions for Samples 51, 55 and 56 shown in FIG. 6 were selectively performed on the dielectric particles having same thicknesses of the central layer and diffusion layer.

TABLE 4

| Sample No. | Subcomponent | | | | | Characteristics | | | |
|---|---|---|---|---|---|---|---|---|---|
| | First BaZrO$_3$ [mol] | Second MgO [mol] | Third Gd$_2$O$_3$ [mol] | Fourth MnO [mol] | Fifth SiO$_2$ [mol] | Mg CMmax/CM | Specific Permittivity | IR Lifetime [h] | Electrostrictive Amt [ppm] |
| 51 | 10.2 | 5.5 | 5.0 | 1.2 | 3.0 | 2.4 | 885 | 22 | 32 |
| 52 | 9.8 | 3.8 | 4.9 | 0.9 | 3.3 | 1.1 | 878 | 21 | 31 |
| 53 | 11.6 | 3.3 | 5.4 | 0.8 | 3.2 | 2.2 | 881 | 21 | 29 |
| 54 | 10.4 | 3.5 | 5.2 | 1.0 | 3.2 | 4.0 | 867 | 20 | 29 |
| *55 | 12.0 | 4.8 | 4.6 | 1.0 | 3.6 | 0.9 | 876 | 9 | 30 |
| *56 | 10.5 | 4.5 | 4.7 | 0.9 | 3.1 | 0.4 | 884 | 8 | 31 |
| *57 | 10.9 | 4.6 | 5.1 | 1.0 | 2.8 | 0.8 | 880 | 8 | 32 |
| *58 | 11.1 | 4.2 | 4.8 | 0.9 | 3.1 | 0.3 | 873 | 7 | 32 |

CMmax means a maximum concentration of Mg in the diffusion layer.
CM means a concentration of Mg at a proximity point to a boundary face positioned at a distance of 5% of particle size of the dielectric particle from the crystal grain boundary in a direction from the crystal grain boundary to the approximate center of the dielectric particle.
*means a comparative example of the present invention.

FIG. 6 shows a graph of concentration distributions of Mg elements in the surface diffusion particles according to Sample No. 51, 55 and 56.

From Table 4, it is confirmed that samples wherein CMmax/CM of Mg element is larger than 1 (Sample No. 51 to 54) is preferable in specific permittivity and electrostrictive amount as well as good IR lifetime. On the other hand, samples having CMmax/CM smaller than 1 (Sample No. 55 to 58) are confirmed to be inferior in IR lifetime. Also, from FIG. 6, it can be visually confirmed that Sample No. 51 (Example) satisfies a relation of CMmax/CM>1 while Example 5

Except for changing an amount of each subcomponent to the amount shown in Table 5, as with Example 4, capacitor samples were produced, and same characteristic evaluations were performed as Example 4. The results are shown in Table 5.

TABLE 5

| Sample No. | Subcomponent | | | | | Characteristics | | | |
|---|---|---|---|---|---|---|---|---|---|
| | First BaZrO$_3$ [mol] | Second MgO [mol] | Third Gd$_2$O$_3$ [mol] | Fourth MnO [mol] | Fifth SiO$_2$ [mol] | Mg CMmax/CM | Specific Permittivity | IR Lifetime [h] | Electrostrictive Amt [ppm] |
| **59 | 11.8 | 4.5 | 2.0 | 0.7 | 3.1 | 2.2 | 876 | 22 | 33 |
| 60 | 10.6 | 5.7 | 4.5 | 0.8 | 3.6 | 2.3 | 886 | 28 | 35 |
| 61 | 9.9 | 4.6 | 5.5 | 1.2 | 3.0 | 2.1 | 766 | 29 | 33 |
| **62 | 10.5 | 5.5 | 8.0 | 0.7 | 2.8 | 2.2 | 687 | 20 | 29 |
| **63 | 11.9 | 1.0 | 4.6 | 1.3 | 3.3 | 1.3 | 902 | 21 | 34 |
| 64 | 11.3 | 2.7 | 5.1 | 1.2 | 3.5 | 1.8 | 890 | 28 | 33 |
| 65 | 11.4 | 5.7 | 5.0 | 0.9 | 3.4 | 2.0 | 768 | 28 | 32 |
| **66 | 10.5 | 9.0 | 5.0 | 1.0 | 3.2 | 2.3 | 724 | 24 | 32 |
| **67 | 10.2 | 4.8 | 5.4 | 0.1 | 3.0 | 2.1 | 898 | 21 | 35 |
| 68 | 9.7 | 5.3 | 4.6 | 0.5 | 3.3 | 2.2 | 877 | 29 | 35 |
| 69 | 11.0 | 5.4 | 4.8 | 1.5 | 3.0 | 2.3 | 828 | 30 | 34 |
| **70 | 12.0 | 4.7 | 5.2 | 2.0 | 3.4 | 2.0 | 779 | 23 | 32 |
| **71 | 6.0 | 4.5 | 4.6 | 1.3 | 3.6 | 2.1 | 912 | 22 | 36 |
| 72 | 9.0 | 4.6 | 5.4 | 0.9 | 2.9 | 2.2 | 894 | 27 | 35 |
| 73 | 13.0 | 3.9 | 5.2 | 1.0 | 3.2 | 2.3 | 854 | 29 | 35 |
| **74 | 16.0 | 4.8 | 5.0 | 1.0 | 3.3 | 2.0 | 815 | 24 | 28 |
| **75 | 11.9 | 5.6 | 5.4 | 1.2 | 1.0 | 2.2 | 848 | 22 | 31 |
| 76 | 11.6 | 3.9 | 4.7 | 1.4 | 3.0 | 2.1 | 889 | 28 | 32 |
| 77 | 10.6 | 4.5 | 4.8 | 0.8 | 3.9 | 2.3 | 912 | 29 | 37 |
| **78 | 10.9 | 4.8 | 5.0 | 0.9 | 5.0 | 2.0 | 972 | 22 | 39 |

CMmax means a maximum concentration of Mg in the diffusion layer.
CM means a concentration of Mg at a proximity point to a boundary face positioned at a distance of 5% of particle size of the dielectric particle from the crystal grain boundary in a direction from the crystal grain boundary to the approximate center of the dielectric particle.
**means a sample out of the preferable range of the present invention.

From Table 5, when changing an amount of each subcomponent, by making the amount of each subcomponent within the preferable range of the present invention, it is possible to obtain further preferable IR lifetime while maintaining specific permittivity and electrostrictive amount well. In contrast, it can be confirmed that samples wherein an amount of each subcomponent is out of the range of the present invention tend to be a little inferior in IR lifetime.

Example 6

For the samples of Example 1, Sample No. 1 to 4, by changing firing conditions from those of Example 1, not only Gd, but also Mg included in the second subcomponent was controlled in its diffusion. Except for the others, as with Sample No. 1 to 4 of Example 1, capacitor samples were produced, and same characteristic evaluations were performed as Example 1 in addition to measurement of IR lifetime as with Example 4. The results are shown in Table 6.

TABLE 6

| | Subcomponent | | | | | Characteristics | | | | |
|---|---|---|---|---|---|---|---|---|---|---|
| Sample No. | First BaZrO$_3$ [mol] | Second MgO [mol] | Third Gd$_2$O$_3$ [mol] | Fourth MnO [mol] | Fifth SiO$_2$ [mol] | Gd CRmax/ CR | Mg CMmax/ CM | Specific Permittivity | Temp Change Rate of Capacitance 125° C.[%] | IR Lifetime [h] | Electrostrictive Amt [ppm] |
| 101 | 11.1 | 5.2 | 4.9 | 1.1 | 3.1 | 2.2 | 2.3 | 876 | −18 | 26 | 30 |
| 1 | | | | | | 1.5 | 0.7 | 882 | −20 | 8 | 30 |
| 102 | 9.9 | 3.7 | 4.8 | 0.8 | 3.2 | 4.3 | 1.1 | 884 | −19 | 24 | 31 |
| 2 | | | | | | 4.2 | 0.9 | 879 | −21 | 9 | 31 |
| 103 | 12.5 | 3.1 | 5.3 | 0.7 | 3.1 | 1.8 | 2.2 | 871 | −17 | 24 | 28 |
| 3 | | | | | | 1.1 | 0.7 | 883 | −21 | 9 | 28 |
| 104 | 10.5 | 3.7 | 5.1 | 0.8 | 3.6 | 5.6 | 2.2 | 883 | −19 | 21 | 29 |
| 4 | | | | | | 5.5 | 0.8 | 883 | −21 | 8 | 29 |

CRmax means a maximum concentration of Gd in the diffusion layer; and CMmax means a maximum concentration of Mg in the diffusion layer.
CR means a concentration of Gd at a proximity point to a boundary face positioned at a distance of 5% of particle size of the dielectric particle from the crystal grain boundary in a direction from the crystal grain boundary to the approximate center of the dielectric particle.
CM means a concentration of Mg at a proximity point to a boundary face positioned at a distance of 5% of particle size of the dielectric particle from the crystal grain boundary in a direction from the crystal grain boundary to the approximate center of the dielectric particle.

From Table 6, it can be confirmed that by controlling diffusion of Gd and Mg, concentration distributions of Gd and Mg satisfy CRmax/CR>1 and CMmax/CM>1.

Due to this, in Sample No. 101 to 104, in addition to preferable characteristics shown in Sample No. 1 to 4, IR lifetime can be also preferable.

What is claimed:

1. A dielectric ceramic composition comprising
a main component including barium titanate,
a first subcomponent including BaZrO$_3$,
a second subcomponent including an oxide of Mg,
a third subcomponent including an oxide of "R", wherein "R" is at least one selected from Sc, Y, La, Ce, Pr, Nd, Pm, Sm, Eu, Gd, Tb, Dy, Ho, Er, Tm, Yb and Lu,
a fourth subcomponent including an oxide of at least one element selected from Mn, Cr, Co and Fe, and
a fifth subcomponent including an oxide of at least one element selected from Si, Al, Ge, B and Li, wherein
said dielectric ceramic composition comprises a plurality of dielectric particles, and crystal grain boundaries between adjacent dielectric particles;
at least a part of said plurality of dielectric particles comprises a surface diffusion structure comprised of a central layer, and a diffusion layer around said central layer in which said subcomponents are diffused;
in the dielectric particle having said surface diffusion structure, in a direction starting from said crystal grain boundary to a boundary face between said diffusion layer and said central layer, when a concentration of said "R" in a proximity point to a boundary face positioned at a distance of 5% of particle size of said dielectric particle from the boundary face of said crystal grain boundary is defined as CR, and a maximum concentration of said "R" in said diffusion layer is defined as CRmax, CR and CRmax satisfy a relation of CRmax/CR>1; and
a point showing the CRmax exists in said diffusion layer except for at the boundary face of said crystal grain boundary and at the boundary face between said diffusion layer and said central layer.

2. The dielectric ceramic composition as set forth in claim 1, wherein an abundance ratio of dielectric particles satisfying the relation of CRmax/CR>1 is 70% or more with respect to all dielectric particles having said surface diffusion structure.

3. The dielectric ceramic composition as set forth in claim 1, wherein a ratio of each subcomponent, calculated as a conversion of an oxide or a composite oxide, with respect to 100 moles of said main component,
first subcomponent: 9 to 13 moles,
second subcomponent: 2.7 to 5.7 moles,
third subcomponent: 4.5 to 5.5 moles,
fourth subcomponent: 0.5 to 1.5 moles, and
fifth subcomponent: 3.0 to 3.9 moles.

4. An electronic device comprising a dielectric layer and an internal electrode layer, wherein said dielectric layer is comprised of the dielectric ceramic composition as set forth in claim 1.

5. The dielectric ceramic composition as set forth in claim 1, wherein in the dielectric particle having said surface diffusion structure, in a direction starting from said crystal grain boundary to a boundary face between said diffusion layer and said central layer, when concentrations of said "R" and Mg in a point close to the boundary face positioned at a distance of 5% of particle size of the dielectric particle from a boundary face of said crystal grain boundary are defined as CR and CM respectively, and maximum concentrations of said "R" and Mg in said diffusion layer are defined as CRmax and CMmax respectively, CR, CM, CRmax and CMmax satisfy relations of CRmax/CR>1 and CMmax/CM>1; and
a point showing the CRmax and a point showing the CMmax exist in said diffusion layer except for at the boundary face of said crystal grain boundary and at the boundary face between said diffusion layer and said central layer.

6. The dielectric ceramic composition as set forth in claim 5, wherein a concentration distribution of said "R" and a concentration distribution of said Mg have one peak, respectively, in said diffusion layer in the direction.

7. The dielectric ceramic composition as set forth in claim 5, wherein the point showing the CRmax and the point showing the CMmax also do not exist at said proximity point.

8. The dielectric ceramic composition as set forth in claim 7, wherein a concentration distribution of said "R" and a concentration distribution of said Mg have one peak respectively in said diffusion layer in the direction.

9. The dielectric ceramic composition as set forth in claim 1, wherein a concentration distribution of said "R" has one peak in said diffusion layer in the direction.

10. The dielectric ceramic composition as set forth in claim 1, wherein the point showing the CRmax also does not exist at said proximity point.

11. The dielectric ceramic composition as set forth in claim 10, wherein a concentration distribution of said "R" has one peak in said diffusion layer in the direction.

12. A dielectric ceramic composition comprising
a main component including barium titanate,
a first subcomponent including $BaZrO_3$,
a second subcomponent including an oxide of Mg,
a third subcomponent including an oxide of "R", wherein "R" is at least one selected from Sc, Y, La, Ce, Pr, Nd, Pm, Sm, Eu, Gd, Tb, Dy, Ho, Er, Tm, Yb and Lu,
a fourth subcomponent including an oxide of at least one element selected from Mn, Cr, Co and Fe, and
a fifth subcomponent including an oxide of at least one element selected from Si, Al, Ge, B and Li, wherein
said dielectric ceramic composition comprises a plurality of dielectric particles, and crystal grain boundaries between adjacent dielectric particles;
at least a part of said plurality of dielectric particles comprises a surface diffusion structure comprised of a central layer, and a diffusion layer around said central layer in which said subcomponents are diffused;
in the dielectric particle having said surface diffusion structure, in a direction starting from said crystal grain boundary to a boundary face between said diffusion layer and said central layer, when a concentration of said Mg in a proximity point to the boundary face positioned at a distance of 5% of particle size of the dielectric particle from a boundary face of said crystal grain boundary is defined as CM, and a maximum concentration of said Mg in said diffusion layer is defined as CMmax, CM and CMmax satisfy a relation of CMmax/CM>1;
a point showing the CMmax exists in said diffusion layer except for at the boundary face of said crystal grain boundary and at the boundary face between said diffusion layer and said central layer; and
an abundance ratio of dielectric particles satisfying the relation of CMmax/CM>1 is 70% or more with respect to all dielectric particles having said surface diffusion structure.

13. The dielectric ceramic composition as set forth in claim 12, wherein a ratio of each subcomponent, calculated as a conversion of an oxide or a composite oxide, with respect to 100 moles of said main component,
first subcomponent: 9 to 13 moles,
second subcomponent: 2.7 to 5.7 moles,
third subcomponent: 4.5 to 5.5 moles,
fourth subcomponent: 0.5 to 1.5 moles, and
fifth subcomponent: 3.0 to 3.9 moles.

14. An electronic device comprising a dielectric layer and an internal electrode layer, wherein said dielectric layer is comprised of the dielectric ceramic composition as set forth in claim 12.

15. The dielectric ceramic composition as set forth in claim 12, wherein a concentration distribution of said Mg has one peak in said diffusion layer in the direction.

16. The dielectric ceramic composition as set forth in claim 12, wherein the point showing the CMmax also does not exist at said proximity point.

17. The dielectric ceramic composition as set forth in claim 16, wherein a concentration distribution of said Mg has one peak in said diffusion layer in the direction.

* * * * *